(No Model.)  F. G. SARGENT.  3 Sheets—Sheet 1.
FIBER WASHING MACHINE.
No. 439,195.  Patented Oct. 28, 1890.
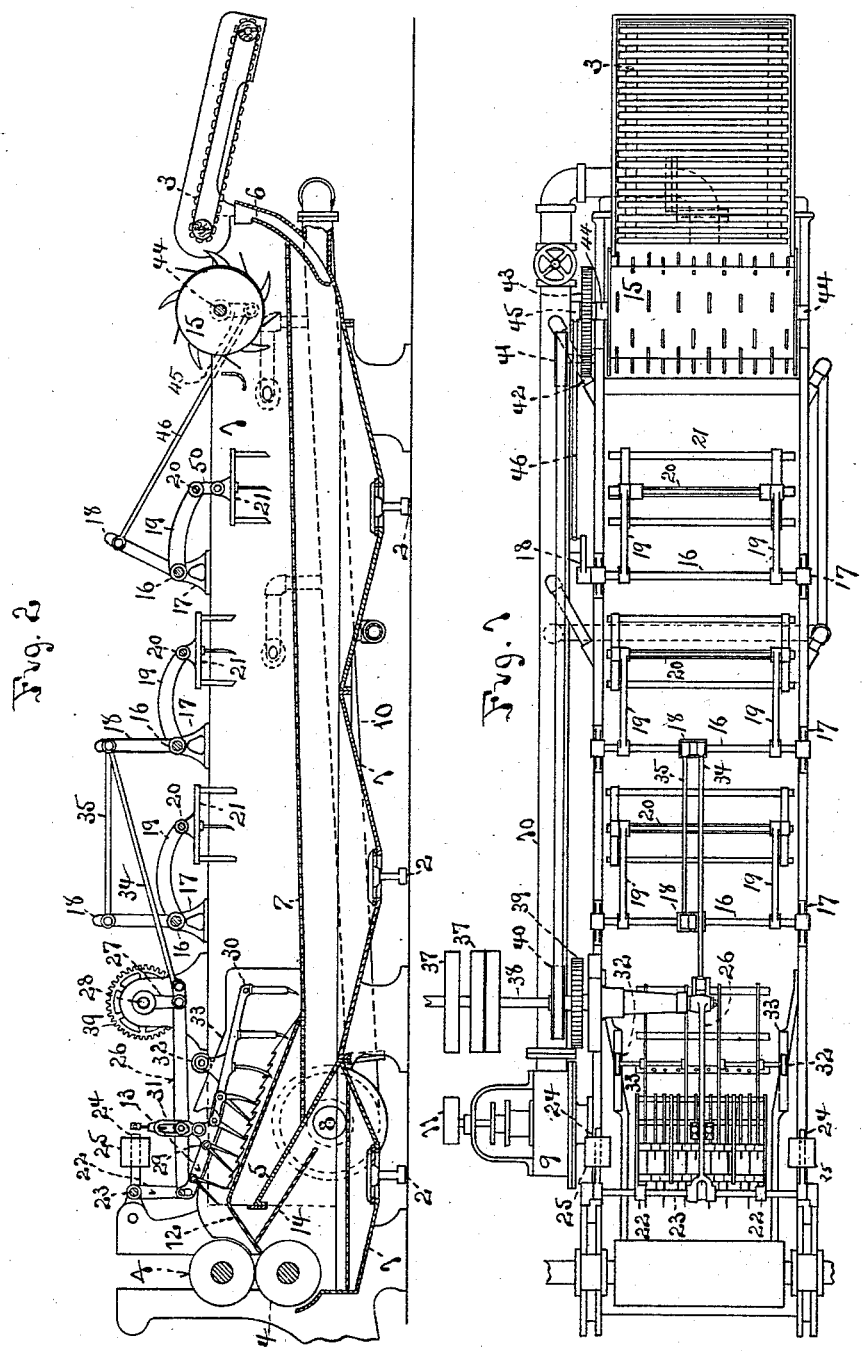
Witnesses  Inventor
N. P. Ockington  Frederick G. Sargent
C. J. Toland  By David Hecestice
  Atty (No Model.) 3 Sheets—Sheet 2.
F. G. SARGENT.
FIBER WASHING MACHINE.
No. 439,195. Patented Oct. 28, 1890.
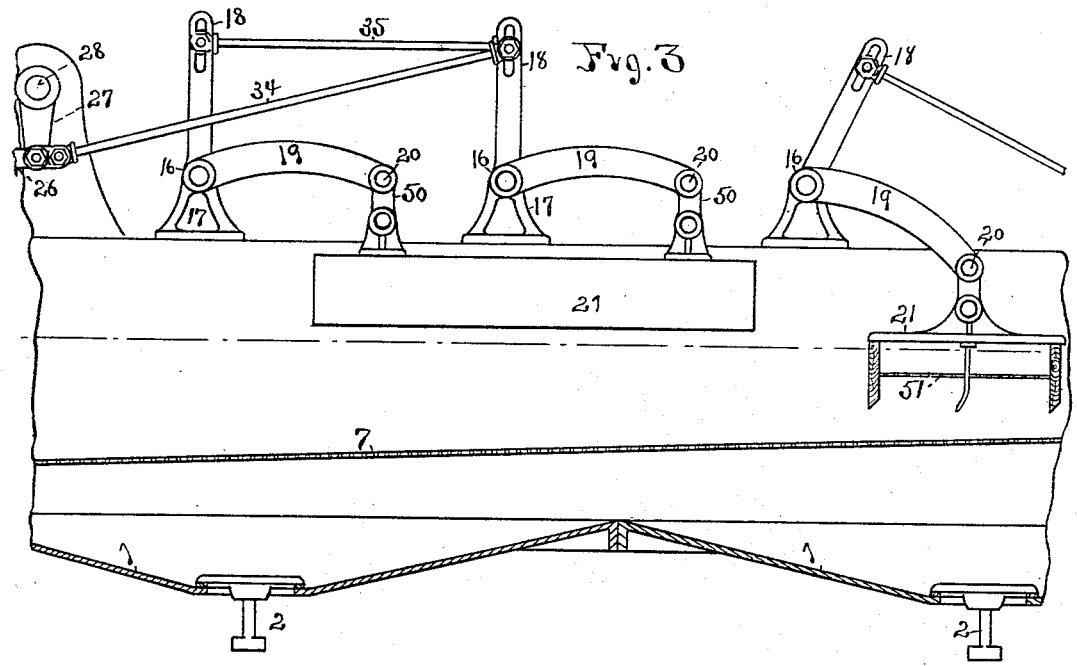
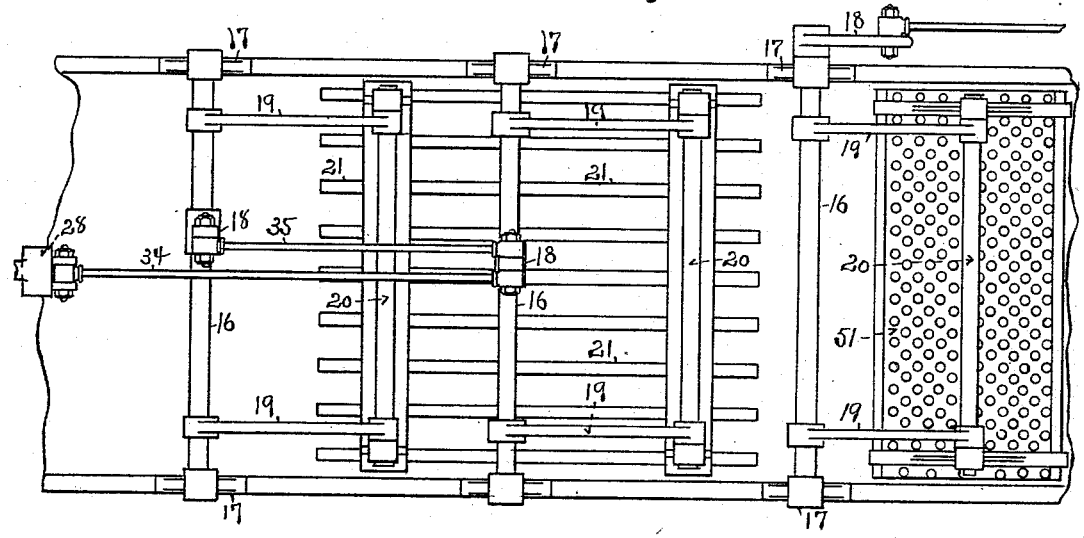
Witnesses
N. P. Ockington
C. J. Poland
Inventor
Frederick G. Sargent
By David H. Rice
Atty (No Model.) 3 Sheets—Sheet 3.

F. G. SARGENT.
FIBER WASHING MACHINE.

No. 439,195. Patented Oct. 28, 1890.

Witnesses
Wm. B. Brown
N. P. Ockington.

Inventor
Frederick G. Sargent
By David Hall Rice
Atty.

UNITED STATES PATENT OFFICE.

FREDERICK G. SARGENT, OF GRANITEVILLE, MASSACHUSETTS.

FIBER-WASHING MACHINE.

SPECIFICATION forming part of Letters Patent No. 439,195, dated October 28, 1890.

Application filed December 17, 1888. Serial No. 293,823. (No model.)

*To all whom it may concern:*

Be it known that I, FREDERICK G. SARGENT, of Graniteville, in the county of Middlesex and State of Massachusetts, have invented a new and useful Improvement in Fiber-Washing Machines, of which the following is a specification.

My invention relates to machines for washing wool and other similar fibers; and it consists in certain new and useful constructions and combinations of the several parts thereof, substantially as hereinafter described and claimed.

Figure 5:
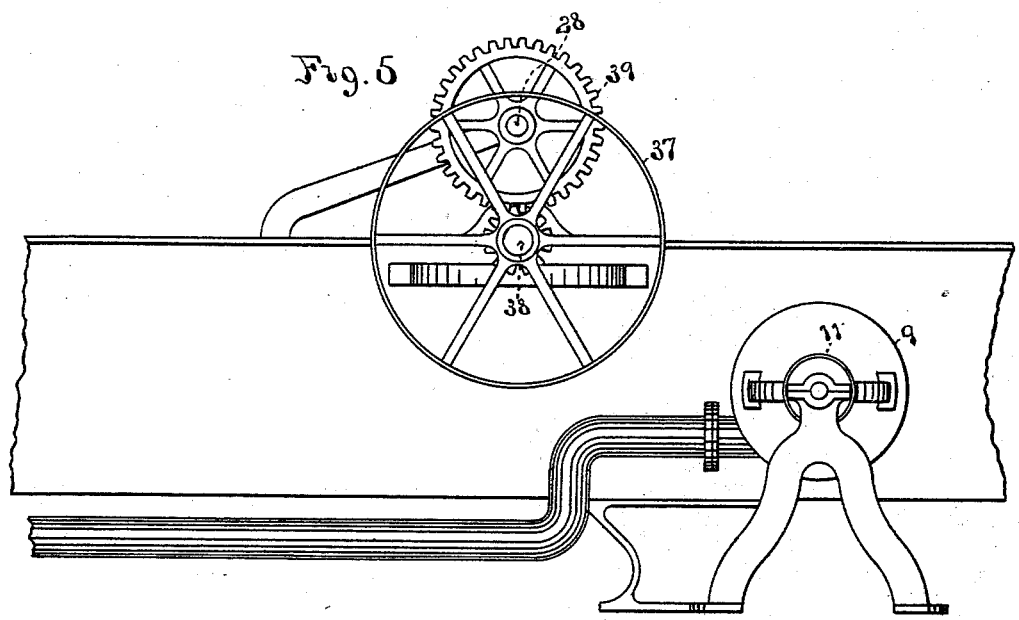
Figure 6:
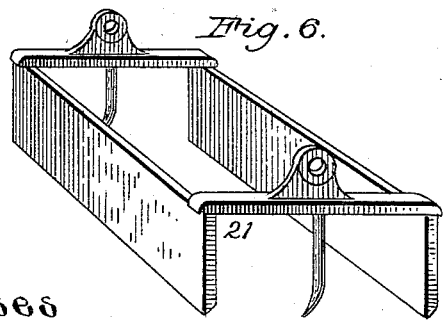

In the drawings, Figure 1 is a top plan view of a wool-washing machine embodying my improvements. Fig. 2 is a longitudinal section through the same adjacent to one side, showing the side of the bowl removed. Fig. 3 represents a portion of Fig. 2 enlarged and with a modification of the sousing apparatus. Fig. 4 is an enlarged plan view of Fig. 3. Fig. 5 is a vertical elevation of a portion of the side of the machine, showing the pump and gearing for driving the carrier and other working parts, the pitmen extending to the carrier, and other working parts being omitted for the sake of clearness. Fig. 6 is a perspective view of the sousing-frame.

The bowl 1 is made in the usual manner, and is provided with valves 2 for drawing off the washing-liquid, and with the feed-apron 3 at one end and the squeeze-rolls 4 4 at the other to feed in the wool at one end and deliver it washed and squeezed at the other. From the bottom of the bowl, near the squeeze-roll end of it, the partition 5 extends upward, inclining at the top toward the squeeze-rolls and fitting closely to the sides and bottom of the bowl, so as to be water-tight, but having its upper edge below the upper edges of the sides of the bowl. At the feed-in end of the bowl another partition 6 is also fitted in like manner to the bowl, following the general conformation of the bowl at a short distance from that end, so as to leave a space between them, and having its upper edge higher than that of partition 5. A false perforated bottom 7 extends horizontally from partition 5 to partition 6 at some distance above the bottom of the bowl, and serves to allow the dirt as it is separated from the wool to fall through and be separated therefrom.

A pipe 8 leads from the squeeze-roll side of partition 5 to the rotary pump 9, and the pipe 10 connects the latter with the space between partition 6 and the feed-in end of the bowl. The pump 9 is driven by the pulley 11 on the outer end of its shaft.

By filling the bowl with washing-fluid until it overflows the partition 5 and also filling the part of the same between partition 5 and the lower squeeze-roll 4 and setting the pump in operation a constant current is created into the space formed by partition 6 and over its top edge and along the false bottom 7 to and over the partition 5, thus carrying the wool forward as it is fed into the bowl by the feed-apron 3.

The carrier-bed 12 inclines upward from the false bottom 7 over the partition 5 to the squeeze-rolls. It is formed of a perforated plate of metal, having inclined teeth on its upper surface to retain the wool and assist the action of the carrier 13. From the carrier-bed, near the squeeze-rolls, the plate 14 inclines downward and backward beneath the partition 5, and serves to direct the overflow of the latter toward the outlet-pipe 8.

A toothed drum 15 at the feed-in end of the machine receives the wool from the feed-apron and serves to submerge it in the washing-fluid. A series of rock-shafts 16 16 are mounted transversely of the bowl in bearings in brackets 17 17, attached to the edges of the bowl. To these rock-shafts are firmly attached the vertical arms 18 18, and at nearly right angles to these arms are firmly attached the pairs of arms 19 to each rock-shaft. The ends of each pair of arms 19 are connected by rods 20, upon which are swung or suspended pivotally sousing-frames 21, consisting of vertical plates held together by cross-bars and having ears attaching them to the rods 20, as described. These sousing-frames are intended to be soused up and down in the washing-fluid by vibrating the rock-shafts 16 by moving the arms 18 back and forth, as hereinafter described.

The carrier 13 is provided with teeth mounted on pivots, as shown, and has its end nearest the squeeze-rolls suspended by the arms 22 from the rock-shaft 23, to which they are attached, the carrier being pivoted at each corner to the lower ends of these arms 22 by a rod passing across the carrier transversely. To the middle of this rod one end of the pitman 26 is attached, the other end being attached to the wrist-pin of crank 27 of shaft 28. The carrier-bed 12 is arranged on its upper surface to be out of parallel with the direction of movement of the carrier and in such relation to the initial movement of the carrier toward the squeeze-rolls that the entire frame of the carrier and its teeth are thrust downward and forward toward the bed while making the same. This is effected by properly proportioning the length of the depending arms 22 and the form of the carrier-bed by which the carrier is made to rapidly approach its bed during this initial forward movement. The length of the depending arms 22 also governs the extent of reciprocation of the carrier up its bed toward the squeeze-rolls. Weights 25 are mounted upon arms 24, attached firmly to the rock-shaft, and these serve to give a quicker downward-thrusting movement to the carrier, as described. This movement comes at the instant that the pivoted teeth swing downward and enter the wool.

To the carrier 13 is pivoted at 29 the supplemental carrier 30, which is supported upon the pitman 26 by the link 31, so as to be raised during the movement of the crank 27 through the upper portion of its path by the pitman. When the crank is traveling the lower portion of its path, the supplemental carrier 30 is supported by the rollers 32 upon the inclined ways 33, as shown in Figs. 1 and 2, and is therefore carried upward parallel with the carrier-bed. The rear end of the pitman 26 projects slightly beyond the crank 27, and is connected by a link 34 with one of the arms 18 of the sousers, and this arm is connected to the arm 18 of the other souser nearest the crank by the link 35. This method of mounting and arranging the carrier and supplemental carrier gives it a different movement in descending upon the carrier-bed from that previously known, because the carrier-bed being inclined in a right line the whole carrier descends upon it with a thrusting movement forward in the direction of the incline of the carrier-teeth forward. This movement serves to thrust the carrier-teeth into the fiber as they swing down to engage with the wool and prevents the ends of the teeth being clogged with bits of fiber as they swing backward by their being drawn more or less transversely across the fiber by the movement of the carrier where the carrier travels parallel with the bed back and forth. The consequent rolling or felting of the fiber is also avoided by the present construction.

The shaft 38 is driven by tight and loose pulleys 37 37 on its outer end and is mounted in counter-shaft supports in the usual way. The shaft 28 has upon its outer end the gear 39, which is driven by a pinion on the inner end of shaft 38, coming underneath it on the face of the bowl. The shaft 38 carries the belt-pulley 40, which is belted to another pulley 41 on a short shaft supported in bracket-bearings on the side of the bowl and carrying the pinion 42, which meshes into the gear-wheel 43, attached to shaft 44 of the drum 15. This shaft 44 projects beyond the face of the gear-wheel 43 and carries on its outer end a crank 45, (shown in dotted lines in Fig. 2,) which is connected by a pitman 46 with the upright arm 18 of the souser nearest to the drum 15, and the revolution of the crank oscillates the rock-shaft 16 and souser 21 as the drum 15 is revolved.

The sousing devices 21 21 maintain their perpendicular position in ascending and descending through the washing-fluid, the current of which, created by the pump, as before described, is relied upon to carry the wool forward. The weight of the sousing devices connected to the carrier is counterbalanced by the weights 25 25 upon the rock-shaft 23, as these weights pull in one direction upon the crank 27 and the sousing devices in the other.

In Figs. 3 and 4 I have shown the sousing devices attached to two of the arms 19 on different rock-shafts and with the vertical plates of the souser 21 arranged longitudinally of the bowl instead of transversely. The sousing device is attached to the rods 20 by an intermediate link 50, instead of directly, as in Figs. 1 and 2. I have also shown a single sousing device 21, having a perforated plate 51 suspended between its vertical bars, to carry the wool down more effectively into the liquid. The operation of these sousing devices is in other respects similar to that heretofore described.

The weights 25 are made heavy enough to not only counterbalance the sousing devices connected to the same frame, but also the weight of the carrier, which tends to pull backward on its inclined ways and against the power applied to the crank 27, and these weights therefore serve to balance the carrier and make it work easier.

What I claim as new and of my invention is—

1. The combination of the carrier 13, provided with the teeth mounted on pivots and suspended from the rock-shaft 23 above it by depending arms and counterbalanced by weights 25, means for operating the same, and the carrier-bed located beneath the carrier out of parallel with its path and formed and arranged to receive the downward and forward thrust of the latter at the moment its pivoted teeth engage with the wool thereon, substantially as described.

2. The combination of the carrier 13, provided with the teeth mounted on pivots and suspended from the rock-shaft 23 above it by depending arms, the driving-shaft 28, crank 27, and pitman 26, arranged to oscillate said rock-shaft by the rotation of the crank, and the carrier-bed located beneath the carrier and out of parallel with its path and formed and arranged to receive the downward and forward thrust of the latter at the moment its pivoted teeth engage with the wool thereon, substantially as described.

3. The combination of the carrier 13, suspended from the rock-shaft 23 above it by depending arms 22, the supplemental carrier 30, pivoted thereto, the pitman 26, connected at one end to said rock-shaft, the link 31, connecting said supplemental carrier to said pitman, the driving-crank 27, connected to the other end of said pitman, and the carrier-bed beneath the carrier out of parallel with its path and formed and arranged to receive the downward and forward thrust of the latter at the moment its pivoted teeth engage with the wool thereon, substantially as described.

4. The combination of carrier 13, suspended from the rock-shaft 23 by depending arms 22, the arms 24, connected to said rock-shaft and provided with weights 25, the pitman 26, driving-crank 27, link 34, rock-shaft 16, its arm 18, connected to said link, and its arm 19, supporting the sousing device upon its outer end and counterbalancing said weights 25, substantially as described.

5. The combination of the rock-shaft 16, provided with an arm 18 and arms 19, projecting therefrom horizontally, and the sousing device 21, pivotally suspended therefrom, substantially as described.

6. The combination of the rock-shaft 16, provided with the arm 18 and the horizontal arms 19, the sousing device 21, pivotally suspended from the outer ends of the latter arms, and the perforated plate 51, attached horizontally to the bars thereof below its upper and lower sides, substantially as described.

7. The combination of the rock-shaft 16, the arms 19 19, the sousing device 21, provided with ears, and the intermediate links 50 50, pivotally connecting the arms 19 with the sousing device, substantially as described.

FREDERICK G. SARGENT.

Witnesses:
ARTHUR B. PLIMPTON,
ALFRED WOODS.